United States Patent [19]
Genequand

[11] Patent Number: 6,059,481
[45] Date of Patent: May 9, 2000

[54] DEVICE FOR THE GUIDANCE IN RECTILINEAR TRANSLATION OF AN OBJECT THAT IS MOBILE IN RELATION TO A FIXED OBJECT

[75] Inventor: Pierre-Marcel Genequand, Geneva, Switzerland

[73] Assignee: CSEM Centre Suisse d'Electronique et de Microtechnique S.A., Neuchatel, Switzerland

[21] Appl. No.: 09/019,724

[22] Filed: Feb. 6, 1998

[30] Foreign Application Priority Data

Feb. 6, 1997 [FR] France ................................ 97 01369

[51] Int. Cl.$^7$ ........................................................ F16F 1/18
[52] U.S. Cl. .......................... 403/220; 403/53; 267/158; 267/160; 188/380
[58] Field of Search .................... 403/52, 53, 57, 403/58, 220, 223; 267/158, 160, 182; 248/638, 562; 188/380

[56] References Cited

U.S. PATENT DOCUMENTS

| | | | |
|---|---|---|---|
| 4,188,645 | 2/1980 | Ragle et al. | 310/331 X |
| 4,322,063 | 3/1982 | Fischbeck et al. | 267/160 X |
| 4,374,402 | 2/1983 | Blessom et al. | 360/76 X |
| 5,293,782 | 3/1994 | Long et al. | 267/160 X |
| 5,390,892 | 2/1995 | Platus | 248/638 |
| 5,505,521 | 4/1996 | Meiller et al. | 267/160 X |

FOREIGN PATENT DOCUMENTS

| | | |
|---|---|---|
| 0 384 947 | 9/1990 | European Pat. Off. . |
| 2233925 | 1/1991 | United Kingdom . |
| WO 91/14886 | 10/1991 | WIPO . |

Primary Examiner—Lynne H. Browne
Assistant Examiner—David E. Bochna
Attorney, Agent, or Firm—Pollock, Vande Sande & Amernick

[57] ABSTRACT

A device for the guidance, in rectilinear translation in a given direction, of an object that is mobile in relation to a fixed object, comprises a first parallelogram, called an intermediate parallelogram, and a second parallelogram, called a guidance parallelogram, opposite the first parallelogram. The guidance device comprises a motion reduction lever that is fixed at a first end to the fixed base by a first flexible reduction band; at a second end to the rigid guidance element by a second flexible reduction band; in its middle to the intermediate rigid element by a third flexible reduction band. The disclosed device can be applied to objects in rectilinear translation.

8 Claims, 2 Drawing Sheets

DEVICE FOR THE GUIDANCE IN RECTILINEAR TRANSLATION OF AN OBJECT THAT IS MOBILE IN RELATION TO A FIXED OBJECT

BACKGROUND OF THE INVENTION

1. Field of the Invention

The present invention relates to a device for the guidance in rectilinear translation, in a given direction, of an object that is mobile in relation to a fixed object.

In general, systems of guidance with low amplitude of displacement use the properties of thin and elongated bands embedded at one end and subjected to forces at the other end. These bands have the property of lending themselves easily to flexing motions in the direction perpendicular to the band while at the same time remaining rigid in the parallel directions.

2. Description of the Prior Art

To obtain a motion of guidance in translation from the flexional properties of thin bands, it is possible to make a device consisting of a parallelogram comprising two equal and parallel flexible bands that are embedded at one end and connected at each of their other ends to a rigid element. Under the effect of an external force dictating a flexing motion to the thin bands, the rigid element shifts while remaining parallel to itself. Thus guidance in translation is obtained for a mobile object joined to said rigid element in relation to a fixed object that is joined to the embedding point of the bands.

When the strains are calculated so that they remain well within the elastic limits and the buckling loads, a perfectly precise and reproducible device is obtained, free from play, friction or wear and tear, and with no phenomena of jamming. The reproducibility is limited only by the residual hysteresis applied to the non-compensated effects due to the variation of the loads and the finite rigidity of the bands. To these advantages, we must add the possibility of making complex systems in a small number of monolithic parts, thus helping to improve reliability and reduce the cost of assembly.

However, the simple parallelogram configuration described here above does not provide perfect guidance in rectilinear translation. Indeed, in addition to the rectilinear translation proper that is sought, there is an error component, perpendicular to the direction of the motion, due to the apparent shortening of the flexible bands which tends to make the rigid element of the parallelogram approach the point of embedding.

To overcome this drawback, there is a known way of improving the rectilinear character of the motion of translation of the mobile object by introducing a second guidance parallelogram in accordance with FIG. 1 which is a drawing of a prior art device for guidance in rectilinear translation.

Briefly, the guidance device of FIG. 1 has a first intermediate parallelogram 10 constituted by two intermediate bands 11 that are flexible in the direction T of translation, fixed at one end 111 to a fixed base 1, joined to said fixed object, and fixed at another end 112 to an intermediate rigid element 12 parallel to the direction T of translation. The second parallelogram 20 is the guidance parallelogram series-connected inside the first parallelogram but opposite so that the two errors of transversal displacement compensate for each other. More specifically, the guidance parallelogram 20 has two guidance bands 21 that are flexible in the direction T of translation, fixed at one end 211 to the intermediate rigid element 12 and at another end 212 to a rigid guidance element 22 that is also parallel to the direction T.

However, although it can be used to a great extent in order to compensate for the errors of lateral displacement of the simple parallelogram, the prior art guidance device shown in FIG. 1 still has two drawbacks:

the precision of compensated guidance is highly sensitive to the longitudinal position of the intermediate rigid element 12 whose translation, when the flexible bands 11 and 21 of the parallelograms 10 and 20 are of equal length, must be exactly equal to half the translation of the rigid guidance element 22;

the intermediate rigid element 12, which is attached solely to the bands 11 and 21 whose rigidity in the direction T of translation is low, has a mode of resonance at low frequency, excitable in the motion of translation, that limits the dynamic performance characteristics of the device.

In order to resolve these difficulties, it has been proposed to link the two rigid translation elements 12 and 22 to an external motion reduction device in which the intermediate element 12 is moved in translation by a gear wheel that is engaged with a gear wheel having twice the radius activating the translation motion of the guidance element 22. Thus, the ratio of two that must exist between the respective displacements of the intermediate and guidance elements is ensured.

However, a known device of this kind can hardly be made in practice because of its complexity and space requirement as well as the non-linear stresses of friction and play introduced by the reduction gear.

SUMMARY OF THE INVENTION

Thus, the technical problem to be resolved by the object of the present invention is to propose a device for the guidance, in rectilinear translation in a given direction, of an object that is mobile in relation to a fixed object, comprising:

a first parallelogram, called an intermediate parallelogram, comprising firstly a pair of bands that are flexible in the direction of translation, known as intermediate bands, substantially equal and parallel to each other, each of said intermediate bands being embedded at a first end in a fixed base, joined to said fixed object and, secondly, an intermediate rigid element, parallel to the direction of translation, fixed at each of its ends to a second end of the intermediate bands;

a second parallelogram, called a guidance parallelogram, opposite the first parallelogram and comprising, firstly, a pair of bands that are flexible in the direction of translation, known as guidance bands, substantially equal and parallel to each other and to the intermediate bands, each of said guidance bands being fixed, at a first end, to said intermediate rigid element and, secondly, a rigid guidance element, parallel to the direction of translation, joined to said mobile object and fixed at each of its ends to a second end of the guidance bands, the guidance device being compatible with a reduction by half of the motion of the intermediate rigid element in relation to the motion of the rigid guidance element, in a manner that is simple, efficient, without play and without friction.

The present invention provides a solution to the technical problem raised wherein said guidance device comprises a motion reduction lever that is fixed:

at a first end to said fixed base by means of a first flexible reduction band;

at a second end to the rigid guidance element by means of a second flexible reduction band;

in its middle to the intermediate rigid element by means of a third flexible reduction band.

The purpose of the reduction bands is to transmit the relative longitudinal motions as rigidly as possible while accommodating, through their flexibility, the errors of lateral displacement of each parallelogram.

Thus, the desired reduction in motions is obtained by the implementation of the technology of elastic joints with all its advantages, namely precision, reproducibility and absence of play, friction, wear and tear and jamming.

Furthermore, through the rigid coupling introduced by the reduction lever between the two mobile elements, the frequency of the resonance mode of the intermediate mobile element is considerably increased, thus at the same time increasing the frequency band of the guidance device of the invention.

According to an advantageous characteristic of the guidance device of the invention, in the resting position of said guidance device, the centers of the three flexible reduction bands are aligned in a straight line perpendicular to the direction of translation.

The alignment of the centers minimizes the dependence of the reduction ratio as a function of the deflection. The perpendicular character minimizes the strain in the reduction bands as a function of bending.

It is then advantageous, according to the invention, for the center of gravity of said reduction lever to be located on the straight line of alignment of the centers of the three flexible reduction bands. A result is thus obtained wherein the mode of resonance of the lever on the reduction bands is not excited by the translation motion.

According to another advantageous characteristic of the guidance device of the invention, in the resting position of said guidance device, the three flexible reduction bands are parallel to the direction of translation so as to maximize the coupling rigidity between longitudinal motions through the reduction lever.

BRIEF DESCRIPTION OF THE DRAWINGS

The following description with respect to the appended drawings, given as non-restrictive examples, will provide a clear understanding of the content of the invention and the way in which it can be obtained. Of these figures.

MORE DETAILED DESCRIPTION

Figure 1:
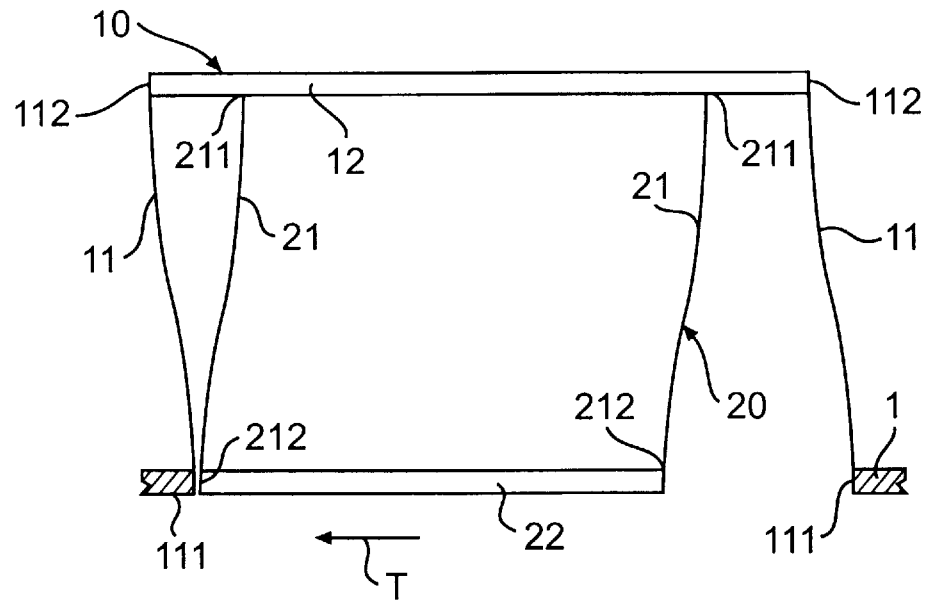
FIG. 1 is a schematic drawings of a prior art guidance device.
Figure 2:
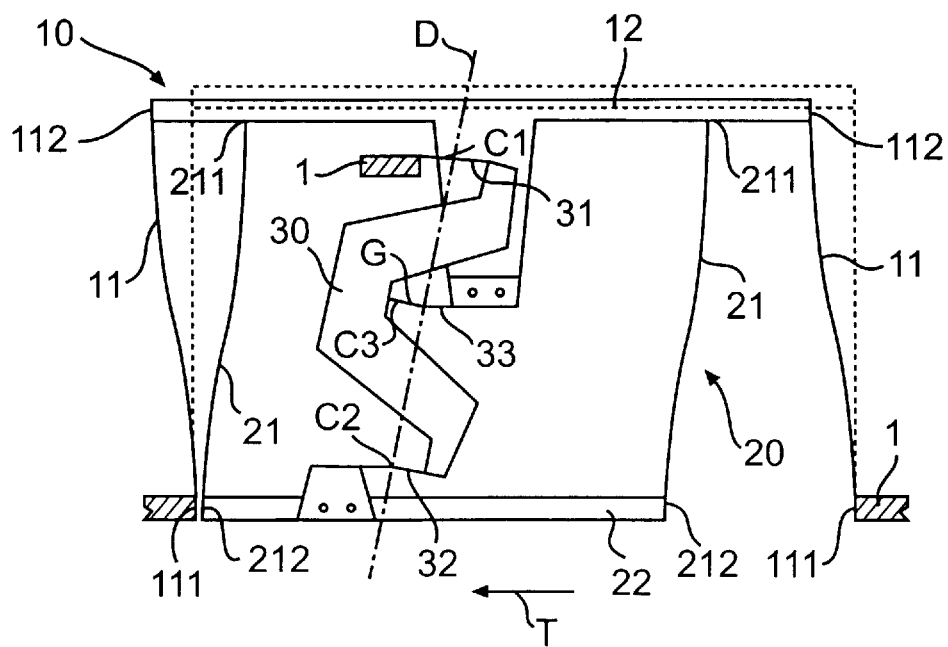
FIG. 2 is a schematic drawing of the guidance device is an object of the invention, in a position where it has undergone bending forces.
Figure 3:
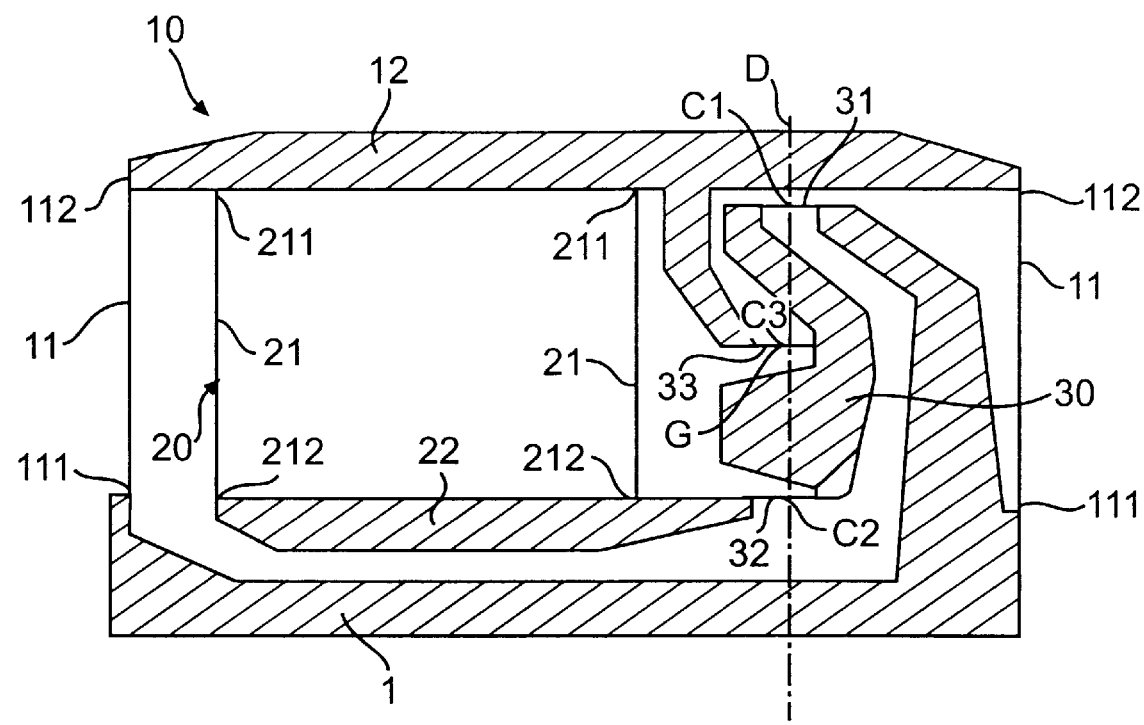
FIG. 3 is a drawing of a particular embodiment of the guidance device of the invention in the resting position.

FIGS. 2 and 3 show a device for the guidance, in rectilinear translation in a given direction T, of a mobile object that is not shown but is joined to a rigid guidance element 22, this object being mobile in relation to a fixed object represented by a fixed base 1.

As is indicated in FIGS. 2 and 3, said guidance device comprises a first intermediate parallelogram 10 consisting of two intermediate bands 11, flexible in the direction of translation T, that are equal and parallel to each other and an intermediate rigid element 12 parallel to the same direction T. Said bands 11 are fixed at a first end 111 to the fixed base 1 and at a second end 112 to the ends of the rigid element 12.

FIG. 2 shows that, under the effect of an external stress, the parallelogram 10 goes from a resting position shown in dashes to a position where it has undergone bending, this position being shown in solid lines. During this motion, the rigid element 12 moves mostly in the desired direction T of rectilinear translation but also, to a smaller extent, in a perpendicular direction which for its part is due to the shortening of the effective length of the bands 10 perpendicularly to the direction T.

In order to cancel out this parasitic effect, the guidance device of the invention has a second parallelogram 20, called a guidance parallelogram, that is inside and opposite to the intermediate parallelogram 10. The function of this parallelogram 20 is to cancel out the transversal displacement of the intermediate element 12 by producing an opposite transversal displacement on a guidance element 22 parallel to the direction T of translation and associated with the mobile object which then totally undergoes only rectilinear motion parallel to the direction T of translation.

To this end, the guidance parallelogram 20 comprises a pair of flexible guidance bands 21 that are substantially equal and parallel to each other and to the intermediate bands 11. Each guidance band 21 that is flexible in the direction T of translation is fixed at a first end 211 to the intermediate element 12 and at a second end 212 to said rigid guidance element 22.

In order to ensure a reduction ratio of half between the displacement of the intermediate element 12 and that of the guidance element 22, the guidance device which is an object of the invention furthermore comprises a motion reduction lever 30 that is fixed:

at a first end to the fixed base 1 by means of a first flexible reduction band 31, at a second end to the rigid guidance element 22 by means of a second flexible reduction band 32, in its middle to the intermediate rigid element 12 by means of a third flexible reduction band 33.

As can be seen more particularly in FIG. 3, when the guidance device is in the resting position, the centers C1, C2, C3 of the three flexible reduction bands 31, 32, 33 are aligned in a straight line D perpendicular to the direction T of translation, so that the reduction factor remains substantially equal to half, whatever the deflection of said reduction bands. It will be seen in FIG. 2 that the alignment of the points C1, C2, C3 on the straight line D is maintained at least so long as the amplitude of the bending forces remained limited.

FIG. 3 also shows that in order to maximize the rigidity of reduction, the three flexible reduction bands 31, 32, 33 are parallel to the direction T of translation when the guidance device is in the resting position.

In order to uncouple the motion of translation from the mode of resonance of the reduction lever 30 on the flexible bands 31, 32, 33, it is planned, as shown in FIGS. 2 and 3, that the center G of gravity of said reduction lever 30 will be located on the straight line D of alignment at the centers C1, C2, C3 of the three reduction bands 31, 32, 33. It can be seen in FIGS. 2 and 3 that, for reasons of symmetry, the center G of gravity of the lever 30 coincides substantially with the center C3 of the third reduction band 33.

It will also be seen in FIG. 3 that the motion reduction lever 30 is positioned outside the guidance parallelogram 20.

This makes it possible to position, for example, a plate of magnets of a mobile magnet actuator in the interior space of said guidance parallelogram.

In a first practical embodiment as shown in FIG. 2, the reduction lever 30 and the three flexible bands 31, 32, 33 may form a monolithic block cut out of a plate of elastic material. Similarly, the guidance device according to the invention as shown in FIG. 3 may also, in its totality, form a monolithic block cut out of a plate of elastic material.

Figure 4:
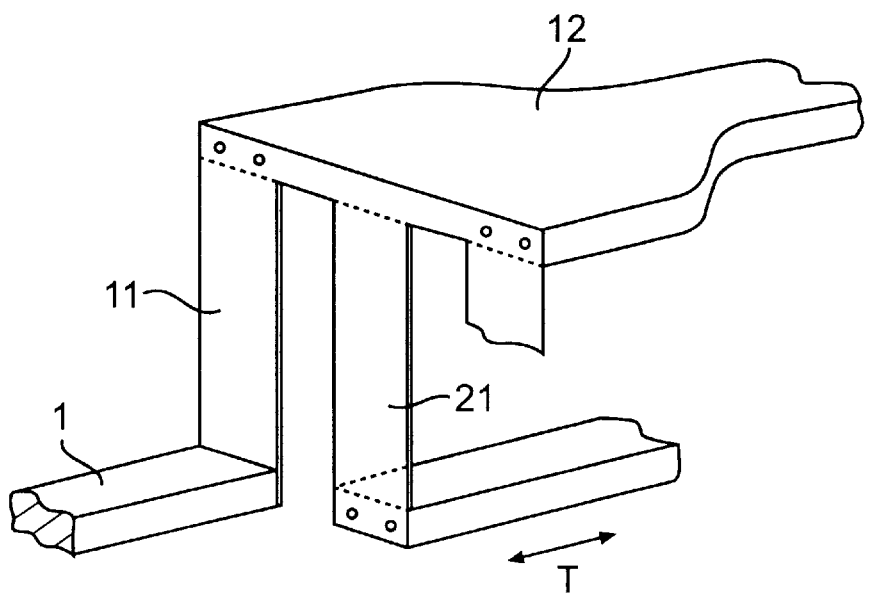
FIG. 4 is a drawing in cavalier projection showing a guidance device according to the invention in which the intermediate bands and the guidance bands are juxtaposed.

A description of the invention is made with reference to a device in which the second guidance parallelogram 20 is inside the intermediate parallelogram 10. However, a relative arrangement of this kind is shown by way of an example. Indeed, the fixed and mobile objects can be permutated so that the inner bands become the outer bands and vice versa. Furthermore, according to other embodiments, the bands of the two parallelograms may be juxtaposed as can be seen in FIG. 4. These intermediate and guidance bands may be formed in one and the same membrane out of an elastic material.

What is claimed is:

1. A device for the guidance, in rectilinear translation in a given direction, of an object that is mobile in relation to a first object, the guidance device comprising:

a first parallelogram, called an intermediate parallelogram, having firstly a pair of bands that are flexible in the direction of translation, known as intermediate bands, substantially equal and parallel to each other, each of said intermediate bands being embedded at a first end in a fixed base, joinable to a fixed object and, secondly, an intermediate rigid element, parallel to the direction of translation, fixed at each of its ends to a second end of the intermediate bands;

a second parallelogram, called a guidance parallelogram, opposite the first parallelogram and having, firstly, a pair of bands that are flexible in the direction of translation, known as guidance bands, substantially equal and parallel to each other and to the intermediate bands, each of said guidance bands being fixed, at a first end, to said intermediate rigid element and, secondly, a rigid guidance element, parallel to the direction of translation, joinable to a mobile object and fixed at each of its ends to a second end of the guidance bands, wherein said guidance device includes a motion reduction lever that is fixedat a first end to said fixed base by means of a first flexible reduction band;

at a second end to the rigid guidance element by means of a second flexible reduction band; and in its middle to the intermediate rigid element by means of a third flexible reduction band.

2. A guidance device according to claim 1 wherein, in a resting position of said guidance device, centers of the three flexible reduction bands are aligned in a straight line perpendicular to the direction of translation.

3. A guidance device according to claim 2, wherein the center of gravity of said reduction lever is located on a straight line of alignment of the centers of the three flexible reduction bands.

4. A guidance device according to claim 1 wherein, in the resting position of said guidance device, the three flexible reduction bands are parallel to the direction of translation.

5. A guidance device according to claim 1, wherein said motion reduction lever is positioned outside the guidance parallelogram.

6. A guidance device according to claim 1, wherein said motion reduction lever and the three flexible bands form a monolithic block cut out of a plate of an elastic material.

7. A guidance device according to claim 6, wherein said guidance device in its totality forms a monolithic block cut out of a plate of an elastic material.

8. A guidance device according to claim 1, wherein the intermediate and guidance bands are juxtaposed and made in one and the same elastic membrane.

\* \* \* \* \*